(12) United States Patent
Akahori

(10) Patent No.: US 7,583,741 B2
(45) Date of Patent: Sep. 1, 2009

(54) LIKELIHOOD CORRECTOR AND LIKELIHOOD CORRECTION METHOD

(75) Inventor: Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 584 days.

(21) Appl. No.: 11/511,258

(22) Filed: Aug. 29, 2006

(65) Prior Publication Data

US 2007/0058740 A1  Mar. 15, 2007

(30) Foreign Application Priority Data

Sep. 9, 2005   (JP)  ............................. 2005-261648

(51) Int. Cl.
H04L 27/06 (2006.01)
H04L 27/28 (2006.01)

(52) U.S. Cl. ....................................... 375/260; 375/341

(58) Field of Classification Search ................. 375/260, 375/267, 340, 341, 350
See application file for complete search history.

(56) References Cited

U.S. PATENT DOCUMENTS

| 6,990,153 | B1* | 1/2006 | Farhang-Boroujeni et al. ................. 375/260 |
| 2006/0209979 | A1* | 9/2006 | Sandell et al. ............... 375/267 |
| 2008/0267098 | A1* | 10/2008 | Walton et al. ............... 370/280 |

FOREIGN PATENT DOCUMENTS

JP  08-293850  11/1996

* cited by examiner

*Primary Examiner*—Don N Vo
(74) *Attorney, Agent, or Firm*—Studebaker & Brackett PC; Donald R. Studebaker

(57) ABSTRACT

In an orthogonal frequency division multiplexing system using a scattered pilot signal, after equalization and Fourier transformation of the received signal, the pilot signals are extracted and further processed to generate likelihood values. In one process, the transformed signal is multiplied by the reciprocal of a variance. In another process, the transformed signal is multiplied by the reciprocal of a mean amplitude and by a weighted signal-to-interference ratio. These processes enable appropriate likelihoods to be obtained despite fast fading, shadowing, and automatic gain control.

16 Claims, 5 Drawing Sheets

LIKELIHOOD CORRECTOR AND LIKELIHOOD CORRECTION METHOD

BACKGROUND OF THE INVENTION

1. Field of the Invention

The present invention relates to the demodulation of an orthogonal frequency division multiplexing (OFDM) signal, more particularly to a likelihood corrector and a likelihood correction method.

2. Description of the Related Art

Terrestrial integrated services digital broadcasting (ISDB-T) is one use of the OFDM digital modulation system, which effectively combats multi-path fading. The ISDB-T OFDM modulated signal (referred to as an OFDM signal below) has a scattered pilot, that is, pilot symbols are scattered through the signal in the frequency and time directions to provide reference amplitude and phase information for demodulation.

Correct demodulation of an OFDM signal requires correct channel estimation and estimation of the frequency offset between the transmitter and receiver. Maximum likelihood estimation can be used for these purposes. Japanese Patent Application Publication No. 8-293850 describes a method that compares likelihoods generated by two likelihood estimators, and updates the receiver's frequency according to the result, but fails to give details of the likelihood estimation process, saying only that the likelihood estimators employ a method used in decoding a convolutional code. This implies a continuous process rather than a process using scattered pilot signals, which are not mentioned in the disclosure.

When the channel and frequency offset estimates are derived from a scattered pilot signal, it is necessary to allow for the effect of the scattering of pilot signal information, but there is no teaching or suggestion in the above disclosure of how this might be done.

SUMMARY OF THE INVENTION

An object of the present invention is to provide a likelihood corrector and a likelihood correcting method that can correct likelihoods of a signal with a data structure having pilot symbols scattered among the data symbols.

A likelihood corrector according to one embodiment of the invention has a pilot symbol extractor for extracting pilot symbols included in an OFDM signal and operating on them to produce complex-valued results; a variance calculator for determining the variance of the complex-valued results; a reciprocal calculator for determining the reciprocal of the variance; and a multiplier for multiplying the OFDM signal by the reciprocal value.

A likelihood corrector according to another embodiment of the invention has a pilot symbol extractor for extracting pilot symbols included in an OFDM signal and operating on them to produce complex-valued results; a mean calculator for determining the mean amplitude of the complex-valued results; a reciprocal calculator for determining the reciprocal of the mean amplitude; a signal-to-interference ratio estimator for estimating a signal-to-interference ratio from the complex-valued results; a quantizing circuit for quantizing the estimated signal-to-interference ratio; a weighting circuit for weighting the quantized signal-to-interference ratio; and a multiplier for multiplying the OFDM signal by the reciprocal of the mean amplitude and the weighted signal-to-interference ratio.

The invention also provides corresponding likelihood correction methods.

The above apparatus and methods enable appropriately corrected likelihoods to be generated from a signal with a data structure having pilot symbols scattered among the data symbols.

DETAILED DESCRIPTION OF THE INVENTION

Figure 1:
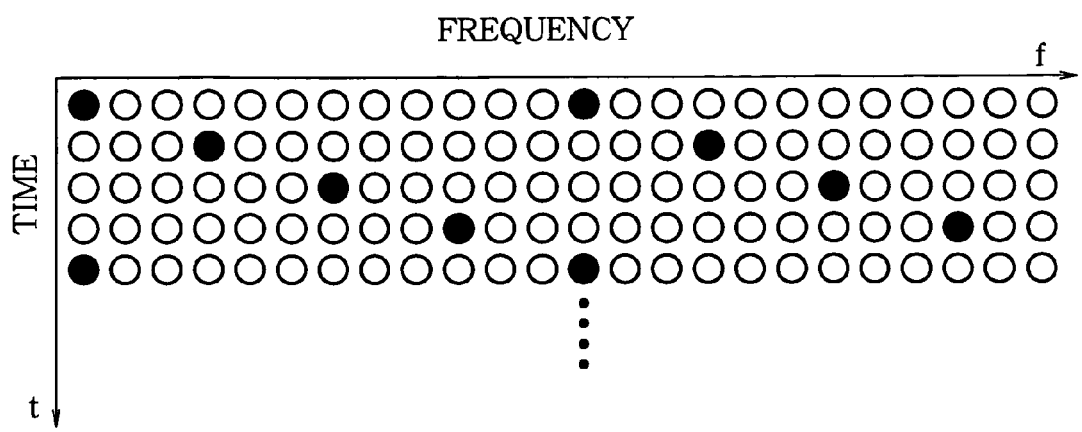
FIG. 1 is a graph showing an arrangement of pilot symbols and data symbols.

Embodiments of the invention will now be described with reference to the attached drawings, in which like elements are indicated by like reference characters.

The embodiments are intended for use with an OFDM signal having a scattered pilot frame structure with pilot symbols scattered among the data symbols as shown in FIG. 1. The black circles in FIG. 1 indicate pilot symbols; the white circles indicate data symbols. In this example, the same pattern of pilot symbols repeats at temporal intervals of four OFDM symbols, but the invention is not limited to this repeating period.

FIRST EMBODIMENT

Figure 2:
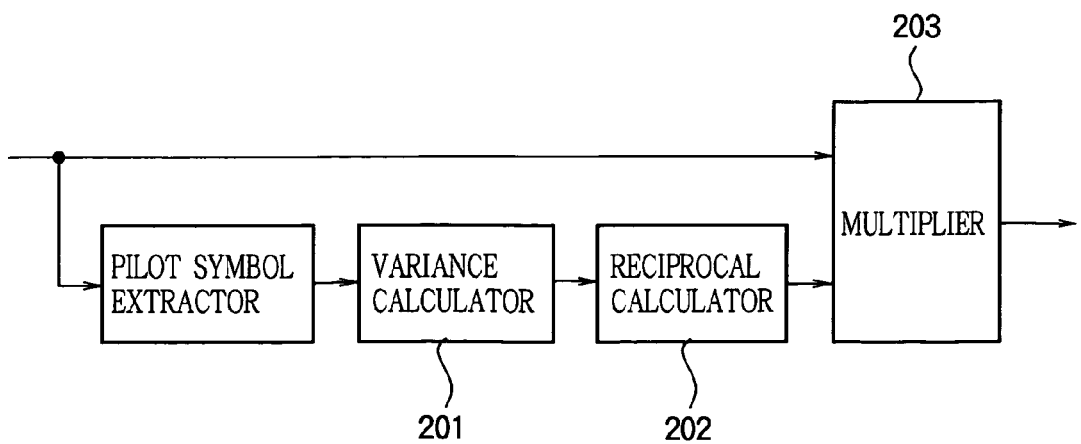
FIG. 2 is a block diagram showing a likelihood corrector in a first embodiment of the invention.

Referring to FIG. 2, the likelihood corrector in the first embodiment of the invention comprises a pilot symbol extractor 200, a variance calculator 201, a reciprocal calculator 202, and a multiplier 203. The OFDM signal input from the left in this drawing is output from an equalizer (not shown) and has already been Fourier-transformed.

The pilot symbol extractor 200 receives the OFDM signal, extracts the pilot symbols included in the OFDM signal one at a time, performs the complex-valued operation given by the expression shown below on the extracted pilot symbols and their a-priori known values (referred to below as the known pilot symbols), and outputs the result as a vector (complex number) describing the phase rotation and amplitude attenuation effects of the transmission channel.

$$\frac{(SP\_r\_i + j \times SP\_r\_q) \times (SP\_ref\_i - j \times SP\_ref\_q)}{SP\_ref\_i^2 + SP\_ref\_q^2}$$

The symbol 'j' in this expression represents a square root of minus one. The known pilot symbol SP_ref and the received pilot symbol SP_r are defined as follows, each having an in-phase component identified by a terminal 'i' and a quadrature component identified by a terminal 'q'.

$SP\_ref = SP\_ref\_i + j \times SP\_ref\_q$ $SP\_r = SP\_r\_i + j \times SP\_r\_q$ Accordingly, the pilot symbol extractor 200 multiplies the complex value of each received pilot signal by the complex conjugate of its known value, and divides the product by the product of the known value and its complex conjugate, which is equal to the sum of the square of the in-phase component of the known value and the square of the quadrature component of the known value. The result of this operation is a complex-valued result that estimates the phase delay and attenuation introduced by the channel at the frequency of a particular pilot symbol. Since the pilot signals have already undergone a Fourier transformation, the values output by the pilot signal extractor 200 will also be referred to as power values.

Figure 3:
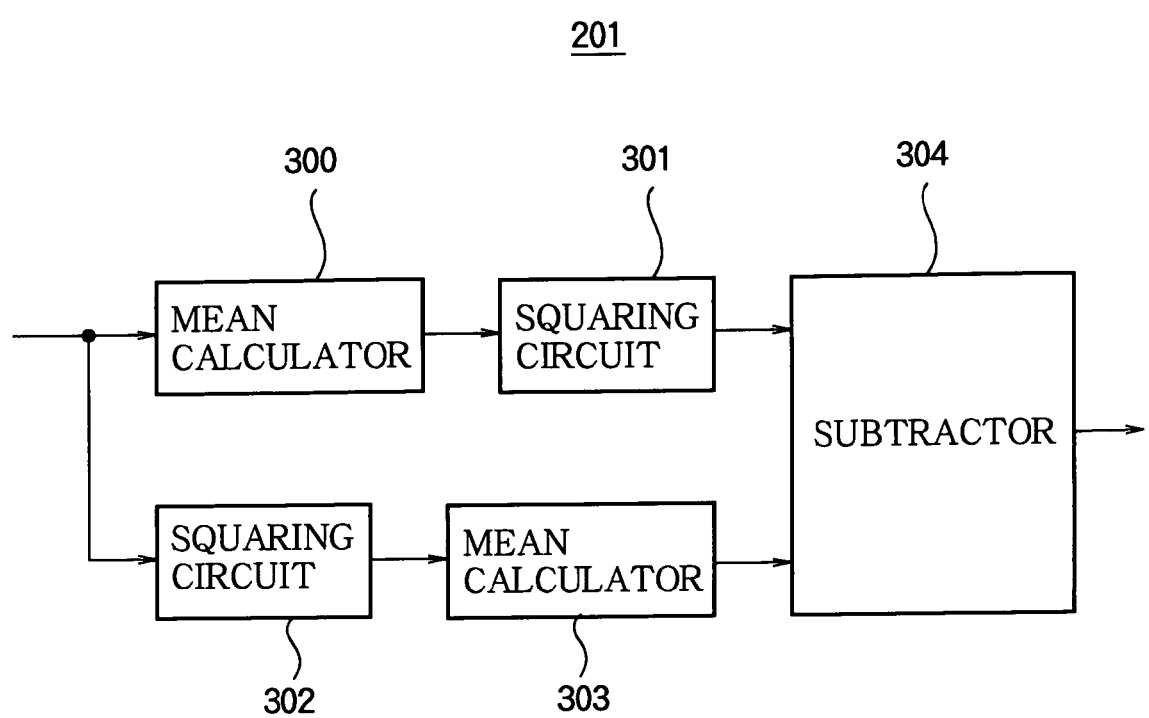
FIG. 3 is a more detailed block diagram showing the internal structure of the variance calculator in FIG. 2.

The variance calculator 201 finds the variance of the complex-valued results by taking the difference between their mean square and the square of their mean. Referring to FIG. 3, the variance calculator 201 comprises mean calculators 300, 303, squaring circuits 301, 302, and a subtractor 304. The first mean calculator 300 determines the mean power of the complex-valued results received from the pilot symbol extractor 200. More specifically, the cumulative power or sum of the complex-valued results is taken, and the resulting value is divided by the number of complex-valued results input. The first squaring circuit 301 squares the output of the mean calculator 300. The second squaring circuit 302 squares the complex-valued results. The second mean calculator 303 takes the mean of the outputs of the squaring circuit 302. Accordingly, the complex-valued results are squared, the sum of the squared values is taken, and the sum is divided by the number of complex-valued result values input. The subtractor 304 subtracts the output value of the squaring circuit 301 from the output value from the mean calculator 303, thereby determining the variance.

The reciprocal calculator 202 takes the reciprocal of the variance output by the variance calculator 201. The multiplier 203 takes the product of the OFDM signal and the output of the reciprocal calculator 202, thereby generating a likelihood signal.

The likelihood corrector and likelihood correcting method in the first embodiment can estimate the variance of noise etc. included in the received signal even if the received signal amplitude is adjusted by automatic gain control (AGC) in the receiver unit due to fading or shadowing. By adjusting the received signal according to the reciprocal of the variance, it is possible to modify the received signal to a signal that generates likelihoods according to the noise power ratio etc. without being affected by the received signal amplitude. Therefore, the likelihood corrector and likelihood correcting method in the first embodiment make it possible to generate likelihoods in which the effects of fast fading and shadowing are reduced. In addition, the more appropriate likelihoods provided by the likelihood corrector and likelihood correcting method of the first embodiment can enhance the error correcting effect of Viterbi decoding, which is used in ISDB-T receivers because the received signal is convolutionally encoded.

SECOND EMBODIMENT

Figure 4:
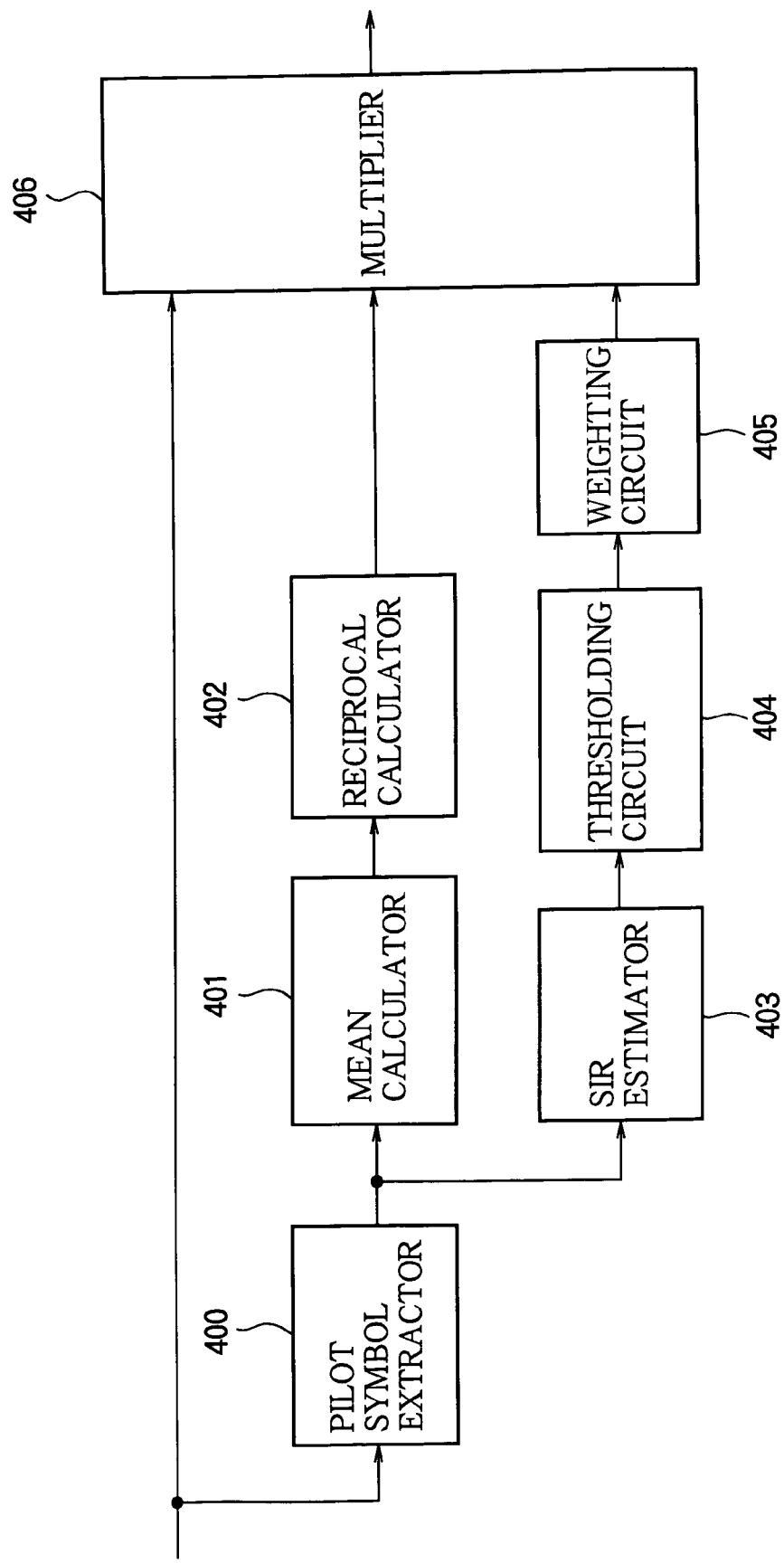
FIG. 4 is a block diagram showing a likelihood corrector in a second embodiment of the invention.

Referring to FIG. 4, the likelihood corrector in the second embodiment of the invention comprises a pilot symbol extractor 400, a mean calculator 401, a reciprocal calculator 402, a signal-to-interference ratio (SIR) estimator 403, a thresholding circuit 404 used as a quantizer, a weighting circuit 405, and a multiplier 406. The OFDM signal input from the left in this drawing is output from an equalizer (not shown) and has been Fourier-transformed as in the first embodiment. The pilot symbol extractor 400 is similar to the pilot symbol extractor 200 in the first embodiment, but outputs complex-valued results for ten pilot symbols at a time.

The mean calculator 401 determines the mean amplitude of the complex-valued results output from the pilot symbol extractor 400 by taking the sum of their complex values and dividing the sum by the number of complex values summed; that is, by the number of pilot signals extracted by the pilot symbol extractor 400. The reciprocal calculator 402 takes the reciprocal of the mean amplitude.

Figure 5:
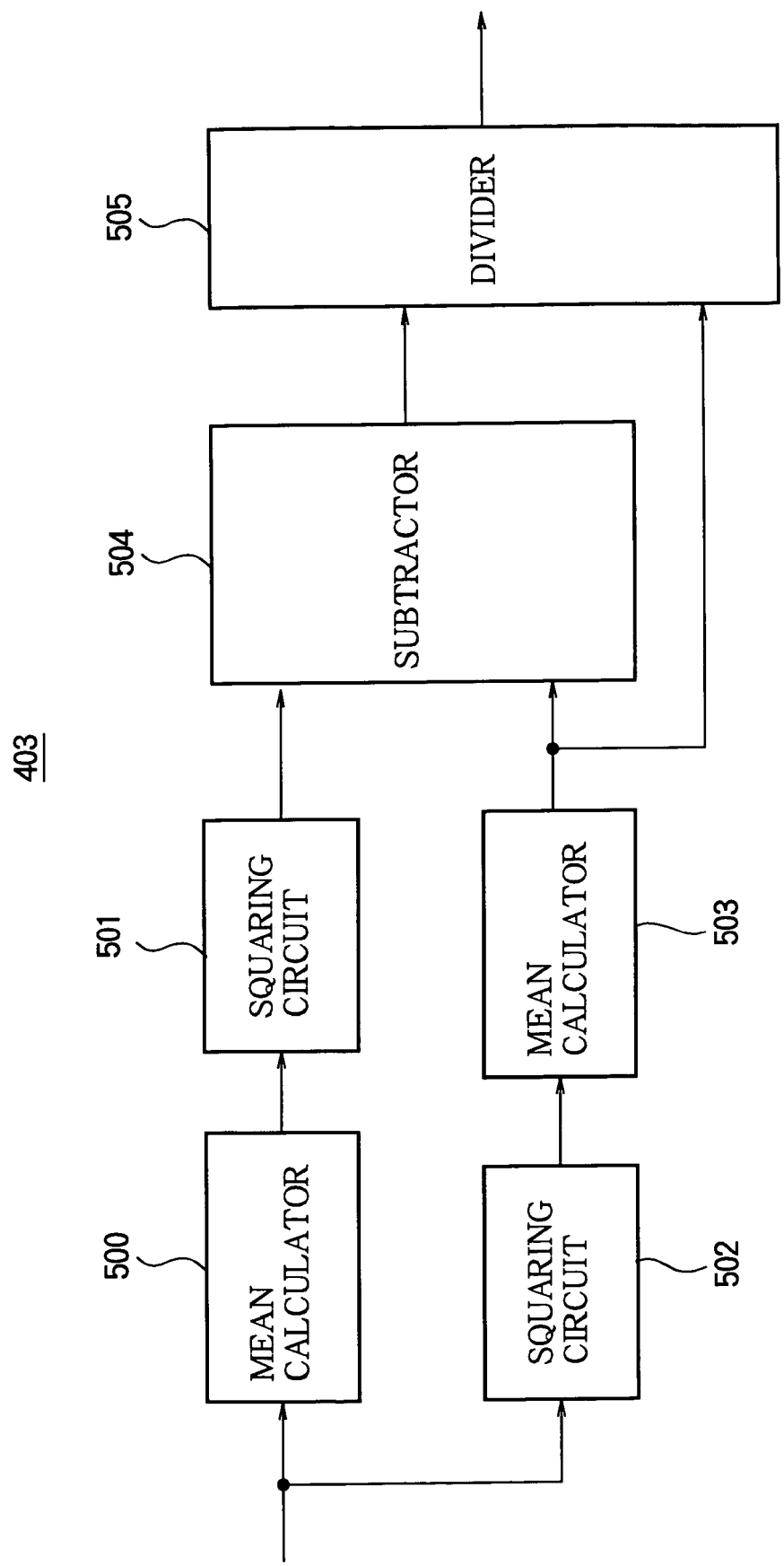
FIG. 5 is a more detailed block diagram showing the internal structure of the signal-to-interference ratio estimator in FIG. 4.

The SIR estimator 403 estimates a signal-to-interference ratio (SIR) by taking a difference between the mean square of the complex-valued results output from the pilot symbol extractor 400 and the square of the mean of these complex-valued results and dividing the difference by the mean square of the complex-valued results. Referring to FIG. 5, the SIR estimator 403 comprises mean calculators 500, 503, squaring circuits 501, 502, a subtractor 504, and a divider 505. The first mean calculator 500 determines the mean power of the complex-valued results received from the pilot symbol extractor 400. More specifically, the cumulative power or sum of the complex-valued results is taken, and the sum is divided by the number of complex-valued results received from the pilot symbol extractor 400. The first squaring circuit 501 squares the mean value output from the first mean calculator 500. The second squaring circuit 502 squares the complex-valued results received from the pilot symbol extractor 400. The second mean calculator 503 takes the mean of the squares output from the second squaring circuit 502. More specifically, the complex-valued results are squared, the sum of the squared values is taken, and the sum is divided by the number of complex-valued results received. The subtractor 504 subtracts the output value of the squaring circuit 501 from the output value from the mean calculator 503, thereby determining the variance. The divider 505 divides the variance determined by the subtractor 504 by the mean square value output by the second mean calculator 503, thereby estimating the SIR.

Figure 6:
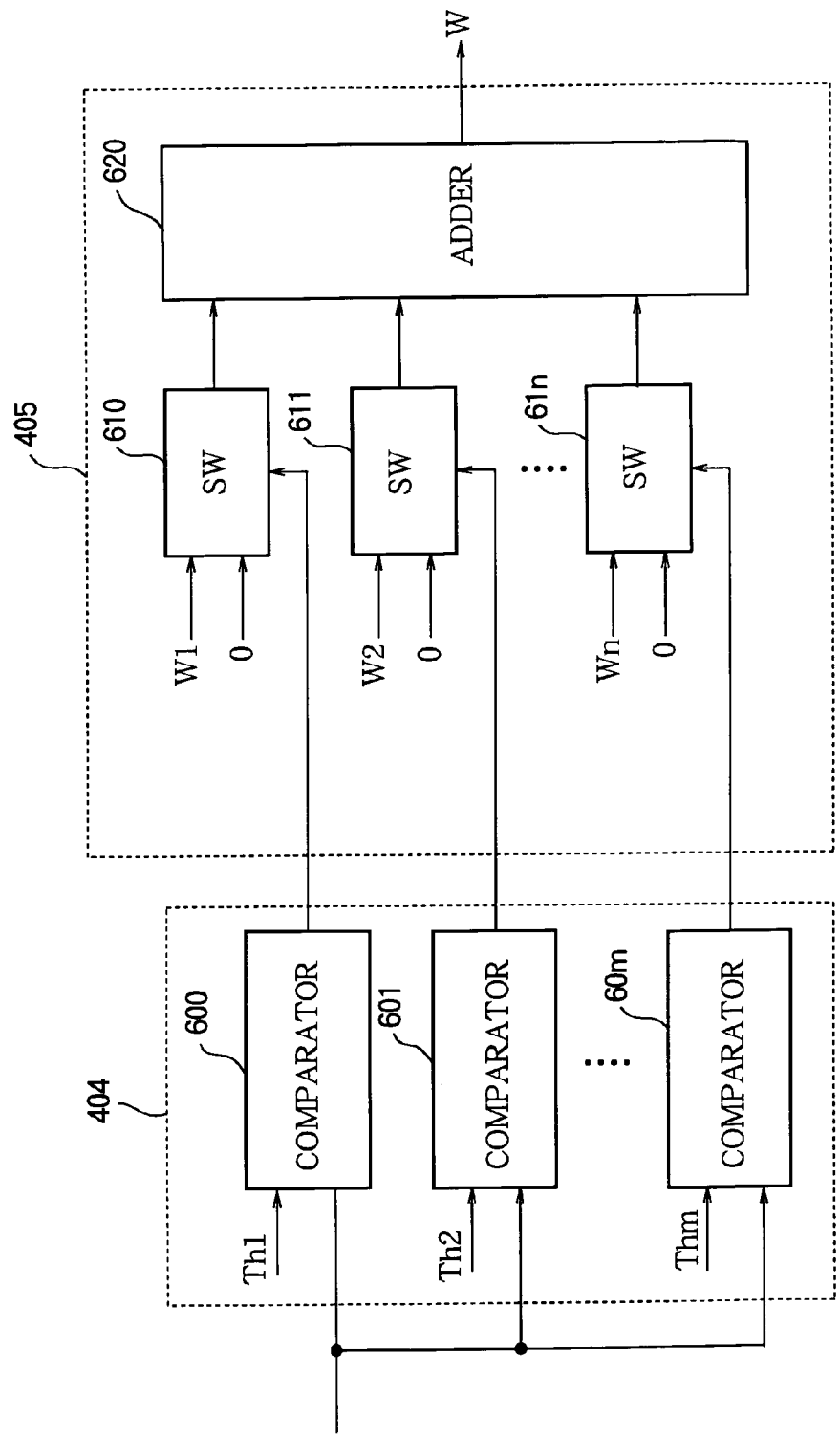
FIG. 6 is a more detailed block diagram showing the internal structure of the thresholding circuit and weighting circuit in FIG. 4.

The thresholding circuit 404 quantizes the estimated SIR. The weighting circuit 405 assigns a weight to the estimated SIR. The thresholding circuit 404 and the weighting circuit 405 will now be described with reference to FIG. 6.

The thresholding circuit 404 comprises a plurality of comparators 600, 601, ..., 60m, where m is a positive integer. The comparators receive the estimated SIR and respective threshold values Th1, Th2, ..., Thm as inputs, and compare the estimated SIR with the input threshold value. The output of the comparison operation is '1' if the estimated SIR is larger than the input threshold value, and '0' otherwise. For example, when m is 3, the estimated SIR is 2.5, and threshold values Th1, Th2, and Th3 are 3, 2, and 1, the comparators 600, 601, and 603 output '0', '1', and '1', respectively. Alternatively, the output of the comparison operation is '0' if the estimated SIR is larger than the input threshold value, and '1' otherwise. The threshold values are not necessarily limited to integers.

The weighting circuit 405 comprises a plurality of switches 610, 611, ..., 61n, and an adder 620, where n is a positive integer equal to m. The switches receive the outputs of respective comparators, a predetermined value ('0' in this case), and respective weighting coefficients W1, W2, ..., Wn as inputs, and output either the weighting coefficient or the predetermined value responsive to the output received from the corresponding comparator. For example, when the output of comparator 600 is '1', switch 610 outputs weighting coefficient W1 (e.g., '19'); when the output of comparator 600 is '0', switch 610 outputs '0'. Alternatively, switch 610 may output weighting coefficient W1 when the output of comparator 600 is '0' and output '0' when the output of comparator 600 is '1'. The weighting coefficients are not necessarily limited to integers. The adder 620 takes the sum of the outputs of the switches 610, 611, ..., 61n, and outputs the sum as a weight W.

The multiplier 406 takes the product of the OFDM signal, the reciprocal of the mean amplitude output by the reciprocal calculator, and the weight W output by the weighting circuit, thereby generating a likelihood signal.

The likelihood corrector and likelihood correcting method in the second embodiment estimate the noise etc. included in the received signal by estimating the signal-to-interference ratio even if the received signal amplitude is adjusted by automatic gain control (AGC) in the receiver unit due to fading or shadowing. By adjusting the received signal according to the SIR estimation result and the reciprocal of the amplitude of the received signal, it is possible to modify the received signal to a signal that generates likelihoods according to the noise power ratio etc. without being affected by the received signal amplitude. Therefore, the likelihood corrector and likelihood correcting method in the second embodiment make it possible to generate appropriate likelihoods in the presence of fast fading and shadowing. In addition, the more appropriate likelihoods provided by the likelihood corrector and likelihood correcting method of the second embodiment can enhance the error correcting effect of Viterbi decoding.

In general, the optimal likelihood is not always proportional to the SIR; in a shadowing environment, for example, receiving characteristics may be improved by decreasing the likelihood for ambiguous information and increasing the likelihood for more definite information. The likelihood corrector and the likelihood correcting method of the second embodiment provide a weighting circuit and a weighting method that enable a non-linear likelihood correction in which the ambiguity and definiteness are converted to optimal values which are reflected as an optimal likelihood value, which results in better receiving characteristics in the presence of shadowing etc.

The invention is not limited to the preceding embodiments, and its applications are not limited to the reception of ISDB-T signals. A person understanding the foregoing discussion of reciprocal variance, reciprocal amplitude, and weighted SIR quantization will recognize that further variations are possible within the scope of the invention, which is defined in the appended claims.

What is claimed is:

1. A likelihood corrector comprising:
    a pilot symbol extractor for extracting pilot symbols included in an orthogonal frequency division multiplexing (OFDM) signal, performing a complex-valued operation thereon, and generating complex-valued results;
    a variance calculator for determining a variance of the complex-valued results;
    a reciprocal calculator for determining a reciprocal value of the variance; and
    a multiplier for multiplying the OFDM signal by the reciprocal value.

2. The likelihood corrector of claim 1, wherein the complex-valued operation comprises multiplying a complex value of each pilot signal by a complex conjugate value of a known value to obtain a complex-valued product.

3. The likelihood corrector of claim 2, wherein the complex-valued operation further comprises dividing the complex-valued product by a sum of a square of an in-phase component of the known value and a square of a quadrature component of the known value.

4. The likelihood corrector in claim 1, wherein the variance calculator takes a difference between a mean square of the complex-valued results and a square of a mean of the complex-valued results.

5. The likelihood corrector in claim 4, wherein the variance calculator comprises:
    a first mean calculator for taking a mean value of the complex-valued results;
    a first squaring circuit for squaring an output of the first mean calculator, thereby generating a first value;
    a second squaring circuit for squaring the complex-valued results;
    a second mean calculator for taking a mean value of the outputs of the second squaring circuit, thereby generating a second value; and
    a subtractor for subtracting the first value from the second value, thereby generating said difference.

6. A likelihood corrector comprising:
    a pilot symbol extractor for extracting pilot symbols included in an OFDM signal, performing a complex-valued operation thereon, and generating complex-valued results;
    a first mean calculator for determining a mean amplitude of the complex-valued results;
    a reciprocal calculator for determining a reciprocal value of the mean amplitude;
    a signal-to-interference ratio estimator for estimating a signal-to-interference ratio (SIR) from the complex-valued results;
    a quantizing circuit for quantizing the estimated SIR;
    a weighting circuit for weighting the quantized estimated SIR to generate a weighted SIR; and
    a multiplier for multiplying the OFDM signal by said reciprocal value and the weighted SIR.

7. The likelihood corrector in claim 6, wherein:
    the pilot symbol extractor extracts the pilot symbols from ten OFDM symbols at a time.

8. The likelihood corrector in claim 6, wherein the complex-valued operation comprises multiplying a complex value of each pilot signal by a complex conjugate value of a known value to obtain a complex-valued product.

9. The likelihood corrector of claim 8, wherein the complex-valued operation further comprises dividing the complex-valued product by a sum of a square of an in-phase component of the known value and a square of a quadrature component of the known value.

10. The likelihood corrector of claim 6, wherein the mean calculator takes a cumulative sum of the complex-valued results and divides the cumulative sum by the number of complex-valued results summed.

11. The likelihood corrector of claim 6, wherein the signal-to-interference ratio estimator takes a difference between a mean square of the complex-valued results and a square of a mean of the complex-valued results, and divides the difference by the mean square.

12. The likelihood corrector in claim 11, wherein the signal-to-interference ratio estimator comprises:
    a first mean calculator for taking the mean of the complex-valued results;
    a first squaring circuit for squaring an output of the first mean calculator, thereby generating a first value;
    a second squaring circuit for squaring the complex-valued results;
    a second mean calculator for taking a mean value of the outputs of the second squaring circuit, thereby generating a second value;

a subtractor for subtracting the first value from the second value, thereby generating said difference; and a divider for dividing said difference by the second value.

13. The likelihood corrector in claim 6, wherein the quantizing circuit comprises a plurality of comparators for comparing the estimated SIR with a plurality of threshold values, each comparator outputting one value if the estimated SIR is greater than one of the threshold values and another value if the estimated SIR is less than one of the threshold values.

14. The likelihood corrector in claim 10, wherein the weighting circuit comprises:

a plurality of switches, each selectively outputting a weighting coefficient or a predetermined value responsive to an output from a corresponding one of the plurality of comparators; and an adder for adding outputs of the plurality of switches.

15. A likelihood correcting method comprising:

extracting pilot symbols included in an OFDM signal;

performing a complex-valued operation on the extracted pilot symbols to obtain complex-valued results;

determining a variance of the complex-valued results;

determining a reciprocal value of the variance; and multiplying the OFDM signal by the reciprocal value.

16. A likelihood correcting method comprising:

extracting pilot symbols included in an OFDM signal;

performing a complex-valued operation on the extracted pilot symbols, thereby obtaining complex-valued results;

determining a mean amplitude of the complex-valued results;

determining a reciprocal value of the mean amplitude;

estimating an SIR from the complex-valued results;

quantizing the estimated SIR;

weighting the quantized estimated SIR to obtain a weighted SIR; and multiplying the OFDM signal by the reciprocal value and the weighted SIR.

* * * * *